Oct. 2, 1934.                F. G. MAYER                1,975,515

DECORATIVE MATERIAL AND METHOD OF MAKING

Filed June 7, 1933

INVENTOR
Frederick G. Mayer
BY
ATTORNEY

Patented Oct. 2, 1934

1,975,515

UNITED STATES PATENT OFFICE 1,975,515

DECORATIVE MATERIAL AND METHOD OF MAKING

Frederick G. Mayer, Morrisville, Pa., assignor to Sloane-Blabon Corporation, Trenton, N. J., a corporation of Delaware Application June 7, 1933, Serial No. 674,646

12 Claims. (Cl. 154—25)

This invention relates to a decorative material and a method of making the same, and particularly to a material comprised of overlapping leaves of plastic material consolidated into an integral mass, but each leaf retaining a distinctive appearance.

It is an object of the invention to provide a material which is capable of embodying novel decorative effects and a method by which such effects can be obtained. The invention is applicable to numerous different kinds of plastic material, including linoleum, rubber, resinous plastics, protein plastics, etc., but being of particular advantage as applied to linoleum, will be described as applied to linoleum manufacture.

In the manufacture of such plastic materials prior to my invention, various decorative effects have been obtained by assembling small pieces of the material having different color characteristics, or otherwise varied surface appearance, and combining these bits of material into an integral mass. In this manner, imitation marble, granite, etc., has been produced, but so far as I am aware, no product has been made prior to my invention by assembling leaves of plastic material, and I have now discovered that in this manner various effects may be obtained which are both pleasing and novel. For example, a material closely resembling terrazzo may be made, as hereinafter more particularly described, and similarly various modernistic effects can be produced.

The leaves of the plastic may be formed in any convenient manner, e. g., by pressing or rolling out individual crumbs of the material, or by forming a sheet and disintegrating it into smaller pieces suitable for assembling in accordance with the invention. In some cases, it will be desirable to produce the more or less serrated edges which result from individually rolling out crumbs, or the ragged edges produced by tearing up a sheet into small leaves. For other effects, it may be more desirable to cut small pieces from a sheet, or to mold the leaves with regular or clean-cut edges. Furthermore, the desired surface appearance of the individual leaves may be controlled according to the practices used in the production of these leaves, e. g., a marbleized, jaspe, or granite effect may be produced in the sheet from which the leaves are cut or torn.

However the leaves are produced, they should be of a size sufficient to stand out in appearance as individual pieces, but ordinarily should be small enough to avoid a daubed appearance. I have found that the most desirable effects are produced with leaves varying in average diameter from about ⅛ in. to 1½ in., or even somewhat larger. In the process of manufacture, the smaller pieces tend to fall to the bottom, so that a considerable amount of finer material may be tolerated.

These leaves are assembled upon a supporting surface, all of them approximately parallel to said surface, and are thereupon compressed and fused together into an integral mass. If it is desired to maintain the shape of the leaves accurately, the compressing step may be performed in a platen press, but where the maintenance of the outlines of the leaves is not so important, I prefer to effect the fusing, at least in part, by means of rolls, e. g., in a calender.

In order to give a fuller understanding of the invention, I have shown in the accompanying drawing, and shall describe below, one embodiment of my invention and the method of its manufacture. This is given merely as an illustration, and is in no way to be taken as limiting the scope of the invention.

In the accompanying drawing, Fig. 1 shows a terrazzo effect produced according to the present invention;

Figure 1:
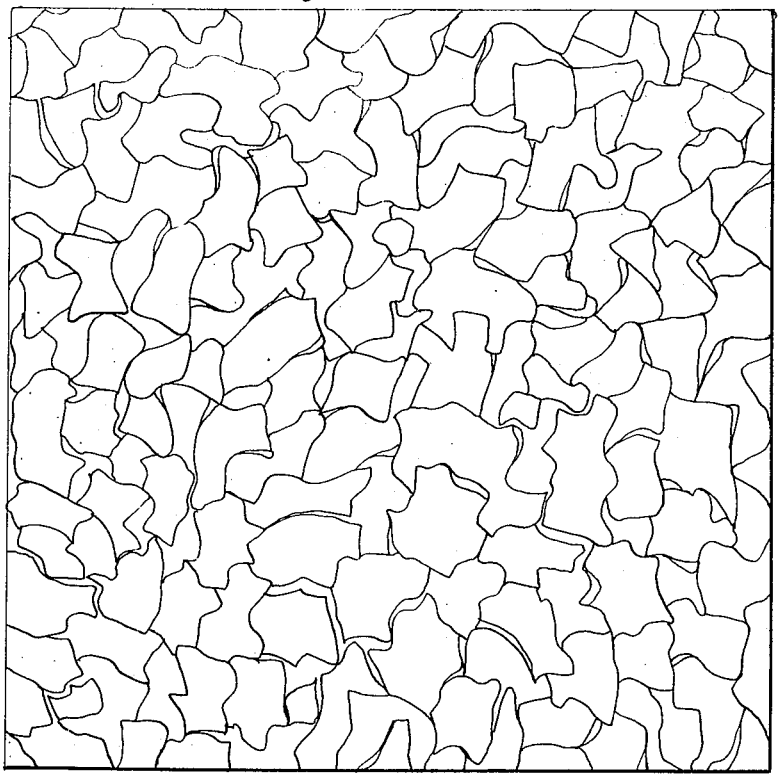
Figure 2:
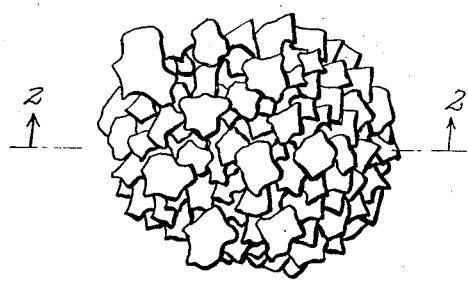
Fig. 2 shows the leaves from which the product of Fig. 1 was built up.
Figure 3:
Fig. 3 shows in cross-section, how these leaves overlap one another before being compressed and fused together into the finished sheet illustrated in Fig. 1.

The leaves 10, as shown in Fig. 2 of the drawing, may, as already stated above, be made in various ways, but in the preferred practice of my invention, I first make up a number of sheets having distinctive color characteristics. Where the finished product is to be a terrazzo, these initial sheets are preferably made with a marbleized appearance in the usual way, e. g., the raw materials of linoleum manufacture, such as gelled oil, cork, wood flour, pigments, etc., are combined in the usual German mixer. The composition coming from the mixers in the form of "doggies" is sheeted in a two-roll calender, and the resulting sheet then fed to a scratcher which disintegrates it into a granular material. A number of different colors of linoleum in this form are then blended, and the resulting granular mixture of various colors is again sheeted in a two-roll calender. In the resulting sheet, the pieces of various colors are drawn out longitudinally, producing a jaspe effect. To convert this into a marbleized effect, the sheets are cut into squares, and are again run through the calender at right angles to the direction in which they first traveled. In this way, the streaks of various colors are irregularly drawn out sidewise, producing the veined appearance similar to the veining of marble.

All of the above is conventional in linoleum manufacture, and may be replaced by any other steps suitable for producing the color effects or appearance desired for the leaves to be used in the manufacture of the finished product according to the present invention.

The sheet, however produced, may then be broken up into leaves. The preferred method for accomplishing this is to feed the sheet into a beater made, for example, with rotating arms adapted to pass between stationary arms within a cylindrical screen. The sheet being picked up by the rotating arms, is torn between them and the stationary arms until the pieces are small enough to pass through the screen. In the preferred embodiment, the screen will have openings approximately ¾ in., and the leaves which come through the screen will have an average diameter very close to the width of the screen openings.

The leaves from the beater may be used directly, but ordinarily I prefer to pass them through a disintegrator which may consist, for example, of a disk having pins projecting from its surface and rotating between disks having pins projecting between the rows of pins on the rotating disk, whereby the leaves from the beater are torn into smaller leaves, e. g., of an average diameter approximately ¼ inch.

This material is then spread onto a backing, e. g., a waxed paper backing on the bed of an inlaid machine. This may be accomplished, for example, by spreading the material out into pans having screen bottoms of about ¾ inch mesh, and spaced from the bed of the machine a distance equal to the thickness desired for the layer of leaves which is to be built up. The backing is moved step by step as in the assembling of inlaid linoleum on a burlap backing, a portion passing at each step under the platen of the inlaid press, where it is hot-pressed, as in the manufacture of inlaid linoleum.

A second wax paper may be run beneath the upper platen of the press to protect the platen from the linoleum during the pressing operation. In the preferred procedure, the upper platen of the press is heated, e. g., by steam at 90 lbs. pressure, to a temperature of about 160° F., and a pressure of about 4000 lbs. per square inch is applied to the material.

The sheet which comes from the platen press contains the leaves in comparatively thick and rather small pieces, and I prefer to subject this sheet to a cross-calendering operation in order to develop the leaves into broader and thinner laminae. To this end, the sheet which comes from the platen press is preferably cut to squares and passed twice through a two-roll calender, first in one direction, and then in a transverse direction at right angles to the first. During these passes, for example, the thickness may be reduced from four to three millimeters on the first pass, and two and one-half on the second pass. During the calendering operation, it is preferable to have the surface of the sheet against a cold roll. The lower roll is ordinarily, but not necessarily, heated.

After the second passage through the calender, as just described, the surface appearance of the sheet is fully developed, and it remains only to cut the sheet to tessarae of the desired form, and to assemble them on a suitable backing in accordance with well known practice in the manufacture of inlaid linoleum.

It will be observed that the leaves, or laminæ of thin linoleum sheet, when first loosely assembled, lie flat upon the backing, i. e., substantially parallel to one another and to the surface of the composite sheet which is being formed. When they are subsequently compacted and compressed to form the final dense, integral sheet, they retain substantially the same arrangement, and are not substantially moved bodily in their relation one to another, even though they may be more or less expanded laterally in the pressing and/or calendering operations.

Although I have described above a particular procedure for producing a decorative material according to my invention, it is to be understood that the invention is in no way limited to such procedure, or to the particular product resulting therefrom, but, on the contrary, many changes and variations may be made, and numerous other materials may be used without departing from the spirit or the scope of my invention.

I claim:

1. A decorative laminated sheet material comprising leaves of plastic material compressed together in overlapping relation and substantially parallel to one another and to the decorative surface into a dense, substantially integral mass, but the leaves at the decorative surface thereof preserving their individuality of coloring so that in spite of their fusion into the integral mass, their outlines remain well defined and are easily recognizable by the contrasting surface appearance.

2. A material as defined in claim 1, in which the leaves are of sizes varying between about ⅛ inch and 1 inch average diameter.

3. A material as defined in claim 1, in which the leaves are variously colored linoleum.

4. A material as defined in claim 1, in which the leaves are irregularly streaked linoleum.

5. The method of making a decorative sheet material which comprises forming leaves of a plastic material, the various leaves having distinctive colorings, so that when assembled one may easily be distinguished from the neighboring leaves, assembling said leaves in substantially parallel overlapping relation and substantially parallel to the decorative surface to be formed, and compressing the resulting assembly into a dense, substantially integral mass, but preserving at at least one surface thereof, the individuality of the leaves so that their areas are readily determinable by distinction of their colorings from those of neighboring leaves.

6. The method as defined in claim 5, in which the compression step includes a rolling out of the assembled leaves regulated to avoid such intermingling of the material across the borders of the leaves as would destroy their apparent definition.

7. The method as defined in claim 5, in which the step of assembling the leaves comprises spreading them loosely and to substantially even thickness upon a substantially horizontal support, whereby they assume naturally substantially horizontal overlapping positions.

8. The method of making a decorative material as defined in claim 5, in which the compressing of the layer includes a calendering operation adapted to spread the pieces in the direction of the pass through the calender without destroying their identity and definition.

9. A method of making a decorative material as defined in claim 5, in which the compressing of the layer includes cross-calendering steps, first in one direction, and then in a direction at right angles thereto, each adapted to spread out the pieces equally without destroying their identity and definition.

10. The method of making a decorative material which comprises forming thin sheets of streaked plastic material, dividing such sheets into relatively small flat pieces, loosely assembling these pieces as laminæ to form a layer of thickness several times that of each laminæ, and in which the laminæ are in substantially parallel, overlapping relation and substantially parallel to the surface of the layer, compressing the resulting assembly into a dense, substantially integral mass while preserving at at least one surface thereof the individuality of the laminæ, so that they are readily distinguishable by their individual colorings.

11. A decorative laminated sheet material, comprising leaves of plastic material assembled in over-lapping and superposed relation, substantially parallel to one another and to the decorative surface, and compressed so as to form a dense, substantially integral sheet of many times the thickness of said leaves of which it is formed, said leaves in several layers from the decorative surface retaining their individuality of coloring, in spite of their fusion into the integral sheet, so that the surface will be made up of well defined areas of contrasting surface appearance, and will be so even after a substantial thickness has been worn away from the sheet.

12. The decorative material, as defined in claim 11, in which the leaves consist of plastic material irregularly pigmented whereby each exhibits a characteristic veining.

FREDERICK G. MAYER.